Figure 1:
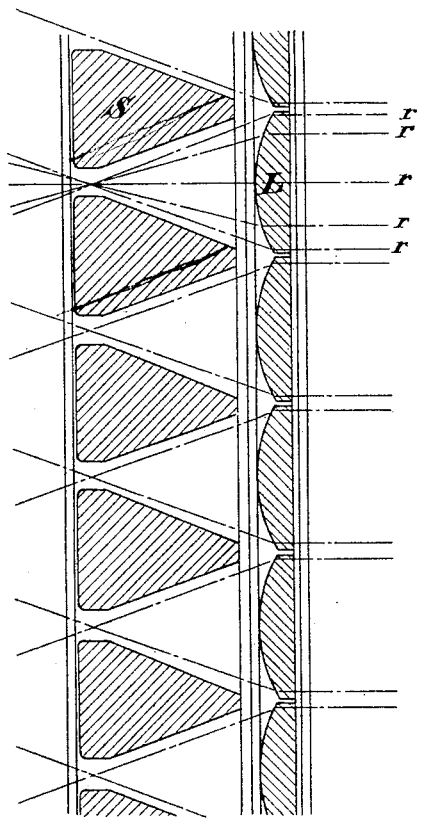

(No Model.)  2 Sheets—Sheet 1.

F. NERZ.
PROTECTIVE DEVICE FOR DISPERSING LENSES OF LIGHT PROJECTORS.

No. 586,799.  Patented July 20, 1897.

Witnesses:—
Edward Rowland
M. M. Robinson

Inventor:
Fidelis Nerz
By Charles J. Kintner
attorney

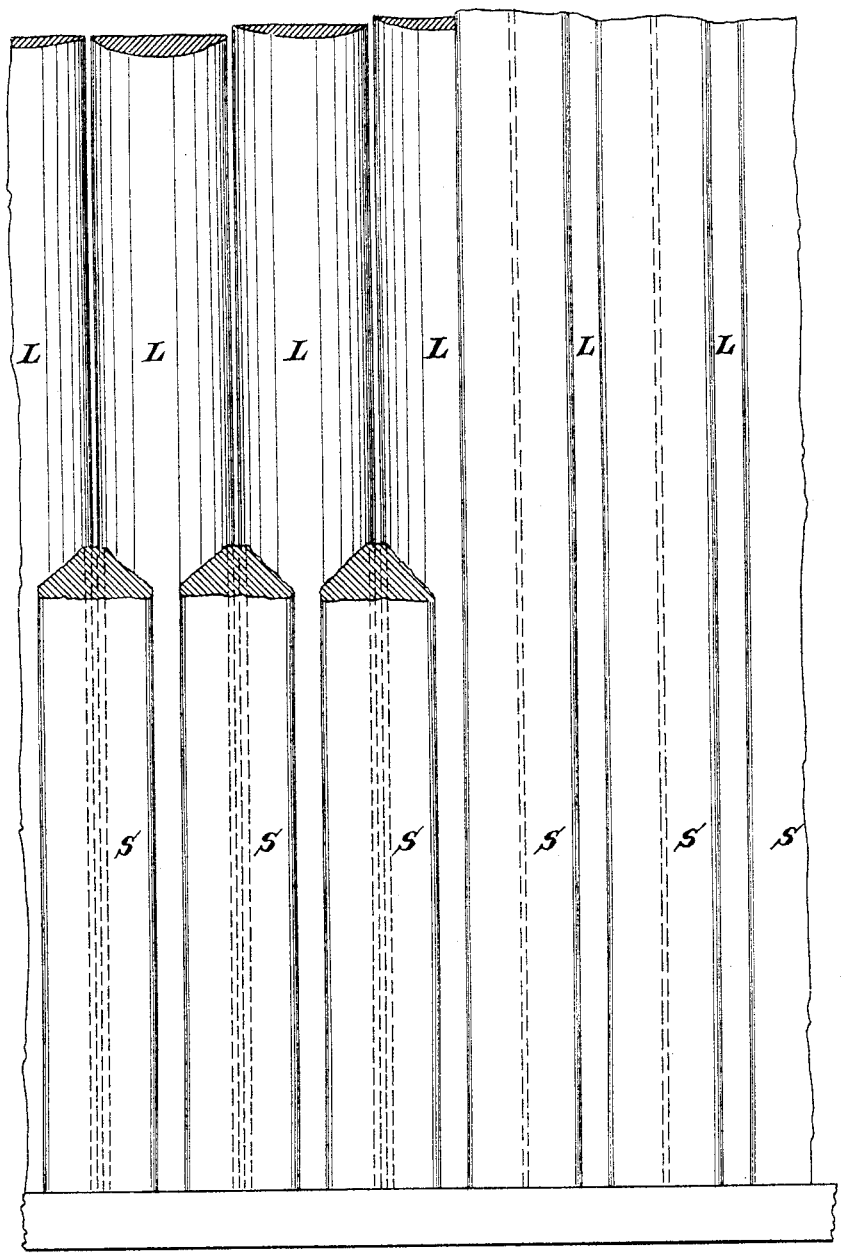

United States Patent Office.

FIDELIS NERZ, OF NUREMBERG, GERMANY, ASSIGNOR TO THE ELEKTRIZITATS AKTIEN-GESELLSCHAFT, VORMALS SCHUCKERT & CO., OF SAME PLACE.

PROTECTIVE DEVICE FOR DISPERSING-LENSES OF LIGHT-PROJECTORS.

SPECIFICATION forming part of Letters Patent No. 586,799, dated July 20, 1897.

Application filed November 5, 1896. Serial No. 611,110. (No model.) Patented in Germany January 18, 1896, No. 87,723.

*To all whom it may concern:*

Be it known that I, FIDELIS NERZ, engineer, a subject of the King of Bavaria, residing at 6 Landgrabenstrasse, Nuremberg, in the Kingdom of Bavaria, German Empire, have invented a new and useful Protective Device for the Dispersing-Lenses of Light-Projectors, (for which I have obtained a patent in Germany, dated January 18, 1896, No. 87,723,) of which the following is a specification.

The present invention refers to a protective device for the lenses of optical dispersers, such as used for search-light, light-projectors, &c.; and it especially consists in arranging a series of bars, by preference steel bars, so that the lenses are not liable to be hurt by hostile projectiles.

My invention will be fully understood by referring to the accompanying drawings, in which—

Figure 1 is a sectional view taken directly through the lenses of an optical disperser, illustrating also in section my improved protective device therefor; and Fig. 2 is a side elevational view of the same, showing the ends of the lenses and protectors in broken section.

My novel protective device consists of a series of bars $S$, &c., arranged in front of lenses $L L$, &c., in the form of a grate, so that the lighting effect is not obviated. In order to secure this purpose, the bars are given a prismatic section, so that the focal lines of the lenses $L$ and the rays $r$ just go through the slot between two bars, the latter not interfering with the rays.

What I claim, and desire to secure by Letters Patent of the United States, is—

A protective device for the dispersing-lenses of light-projectors constructed of prismatic bars so arranged that the focal lines of the lenses always pass through the interstices between the bars, substantially as described and illustrated.

In testimony whereof I have hereunto set my hand in the presence of two subscribing witnesses.

FIDELIS NERZ.

Witnesses:
 JACOB BIERLEIN,
 FRANZ BINKING.